UNITED STATES PATENT OFFICE.

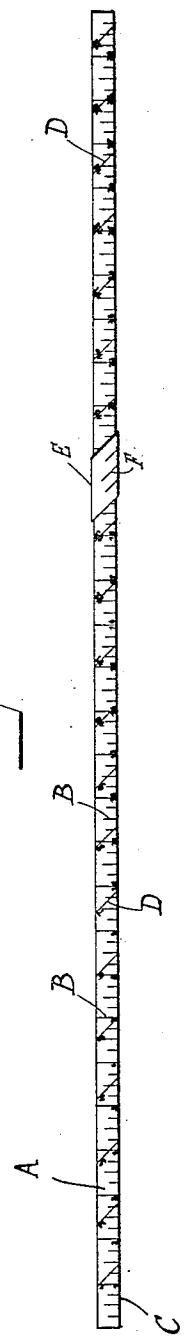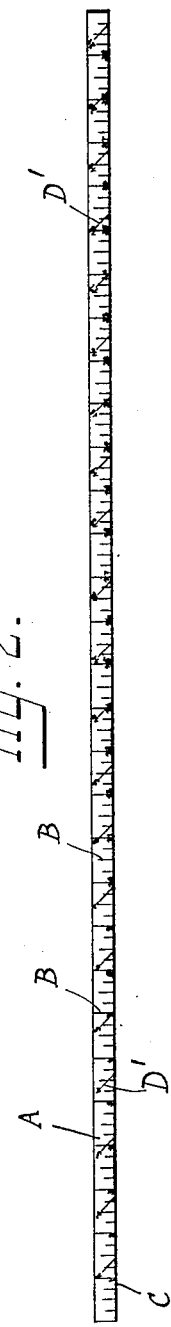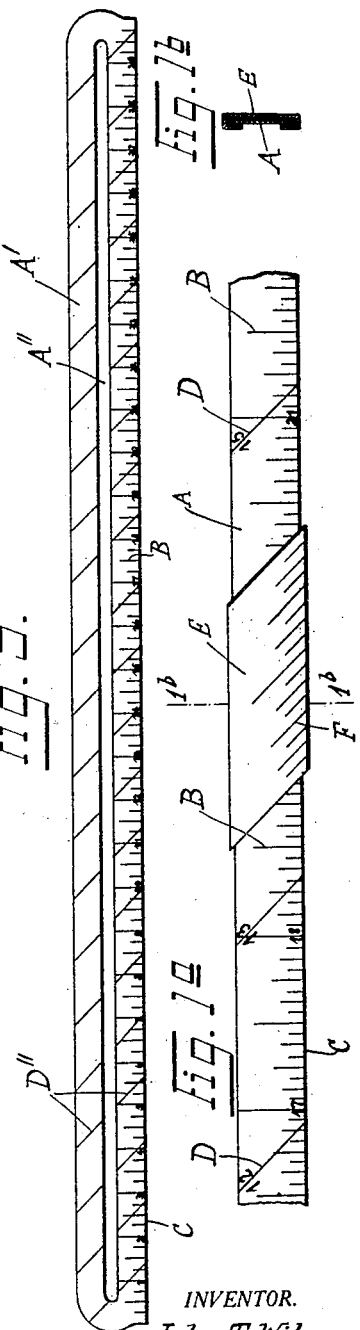

JOHN THOMPSON WILSON, OF JERSEY CITY, NEW JERSEY.

MEASURING DEVICE.

1,396,308.  Specification of Letters Patent.  Patented Nov. 8, 1921.

Application filed August 20, 1920. Serial No. 404,884.

*To all whom it may concern:*

Be it known that I, JOHN THOMPSON WILSON, a subject of the King of Great Britain, residing at Jersey City, county of Hudson, and State of New Jersey, have invented certain new and useful Improvements in Measuring Devices, of which the following is a specification.

My invention relates to tapes, rules, and like measuring devices and has for its object to provide a simple and convenient implement of this class which will enable the user to readily measure or construct right angles, and the improvement is particularly suited for the needs of carpenters, contractors and other persons engaged in the construction of buildings.

Three satisfactory and preferred embodiments of my invention will now be described in detail with reference to the accompanying drawings, in which Figures 1, 2, and 3 are face views of said three forms of my invention; Fig. 1$^a$ is an enlarged face view of a portion of the measuring device shown in Fig. 1; and Fig. 1$^b$ is a section on line 1$^b$—1$^b$ of Fig. 1$^a$.

The form of my invention illustrated by Fig. 3 is also disclosed in my pending application for Letters Patent of the United States filed Sept. 13, 1919, Serial No. 325,640, and in this respect my present application is a continuation in part of said earlier application.

Figs. 1, 1$^a$, 1$^b$, and 2 show two forms of my invention which are generally constructed as measuring tapes, that is to say, of flexible material, but I desire it to be understood that they may be of rigid material, for instance wood, if preferred.

The tape or body A of Figs. 1, 1$^a$, 1$^b$ and 2 is made with the usual scale or graduations B the lines of which run at right angles to the edge C. In addition thereto, I provide a second set of graduation or division lines D (Figs. 1 and 1$^a$) or D' (Fig. 2) which extend to the edge C, but at a slant thereto, preferably at an angle of 45°, as shown, although this is not essential. The unit of these graduations D or D' bears a definite relation to the unit of the graduation B, being in the ratio of $\sqrt{2}$ to 1. The advantage of this arrangement will be readily understood from an example. Suppose that in the construction of a building it is desired to determine whether a corner thereof forms a true right angle. The user will then, with the aid of the scale B, measure off equal distances, say 15 feet, horizontally from said corner along both walls, it being assumed that in this particular case the unit of the scale B is one foot. All the user has to do, is to measure the hypotenuse between the two points at 15 feet from the corner, and if this distance or hypotenuse is found to be of the length indicated by the number 15 of the scale D or D', he will know that the angle is a right angle, and no calculation or looking up of tables will be required on his part. It will be obvious, from the description given above, that any length expressed in units of the scale D or D', will represent the hypotenuse of an isosceles right-angled triangle the sides of which will be indicated by the same number, if measured in units of the scale B.

As will be seen from the drawings, the scale D or D' has only divisions corresponding to the units, inasmuch as lines indicating subdivisions would be confusing. Still, as in so many cases it will be desirable to measure subdivisions of the scale D or D', I may provide a slide E (Figs. 1, 1$^a$, and 1$^b$) generally made of metal or other relatively rigid material, adapted to be shifted lengthwise of the tape or body A and having its transverse edges or ends parallel to the lines of the scale D or D', and the length of this slide is preferably exactly equal to one unit of said scale. The slide E has on its front face a slanting graduation or scale F having as many subdivisions to one of its units as a unit of the scale B. That is, if the units of the scale B are subdivided into sixteenths, there will be sixteen subdivisions in the scale F, as shown in Fig. 1$^a$. This expedient will enable the user to read off fractions in connection with the scale D or D', without the confusion that would exist if the slanting subdivisions were marked directly on the tape or body A throughout its length. It will be understood that when the slide E is used, its oblique ends are brought into registry with two unit marks of the scale D or D', at the portion of that scale where it is desired to measure fractions. For instance, if the two equal sides of an isosceles triangle, supposed to be a right-angled triangle, have been measured with the scale B of Fig. 1$^a$ and found to be 13$\frac{3}{16}$ feet, the slide E will be adjusted along the body A until the left hand edge of said slide registers with the slanting mark numbered 13, of the scale D; then the third side of the triangle is measured with the scale D in connection with the scale F of slide E, and if this third side is found to be equal to 13 3/16 units of the scale D, F, this will show that the triangle is truly a right-angled triangle.

The only difference between the scale D of Figs. 1 and 1ª, and the scale D' of Fig. 2, is that the lines of the scale D run through from one edge of the body A to the other, whereas the lines of the scale D' run only to the edge having the scale B, and stop short of the opposite edge. This arrangement shown in Fig. 2 may be preferred in that it precludes the possibility of mistakes occurring by measuring from the slanting scale at the upper edge of the body A instead of at the lower edge C.

The form of my invention illustrated in Fig. 3 is generally made of relatively rigid material, and consists of a body rule or bar A' having a longitudinal slot A'' dividing it into two portions, one of which has the ordinary scale B along the edge C, and also the improved slanting scale D'' (here shown without any numbers) the lines of which may be extended to the portion of the body A above the slot A''. This form of my invention is especially adapted for use in conjunction with a square, as in my application referred to above, or other instruments or devices of this type. Of course the unit of the scale D'' is related to that of the scale B, as $\sqrt{2}$ to 1.

It will be understood that a slide such as E with the slanting graduation F might be used in conjunction with the forms of my invention shown in Figs. 2 and 3, and that various modifications may be made without departing from the nature of my invention as set forth in the appended claims.

I claim:

1. A measuring device consisting of a body having a scale along one of its edges with division lines indicating units and fractions thereof, and another scale along said edge with division lines which indicate units only and are at an angle to the division lines of the first scale, the units of one scale being different from those of the other yet bearing a definite relation thereto, and a slide movable along said body and provided, at the edge corresponding to the graduated edge of the body, with lines indicating fractions of a unit of the second-named scale.

2. A measuring device consisting of a body having a scale along one of its edges with division lines indicating units and fractions thereof, and another scale along said edge with division lines which indicate units only and are at an angle to the division lines of the first scale, the units of one scale being different from those of the other yet bearing a definite relation thereto, and a slide movable along said body and having its ends parallel to the division lines of the second-named scale and spaced at a distance equal to one unit of said scale, said slide being provided, at the edge corresponding to the graduated edge of the body, with lines indicating fractions of a unit of said second-named scale.

In testimony whereof I have affixed my signature.

JOHN THOMPSON WILSON.